(12) United States Patent
Poo Palam et al.

(10) Patent No.: US 9,090,517 B2
(45) Date of Patent: Jul. 28, 2015

(54) CONTROLLED-RELEASE FERTILIZER

(71) Applicants: Kosheela Devi Poo Palam, Selangor (MY); Khalid Haron, Selangor (MY); Hazimah Abu Hassan, Selangor (MY); Shoot Kian Yeong, Selangor (MY); Tuan Noor Maznee Tuan Ismail, Selangor (MY); Rozana Abu Bakar, Selangor (MY)

(72) Inventors: Kosheela Devi Poo Palam, Selangor (MY); Khalid Haron, Selangor (MY); Hazimah Abu Hassan, Selangor (MY); Shoot Kian Yeong, Selangor (MY); Tuan Noor Maznee Tuan Ismail, Selangor (MY); Rozana Abu Bakar, Selangor (MY)

(73) Assignee: MALAYSIAN PALM OIL BOARD, Bandar Baru Bangi (MY)

( * ) Notice: Subject to any disclaimer, the term of this patent is extended or adjusted under 35 U.S.C. 154(b) by 0 days.

(21) Appl. No.: 14/359,559

(22) PCT Filed: Nov. 20, 2012

(86) PCT No.: PCT/MY2012/000277
§ 371 (c)(1),
(2) Date: May 20, 2014

(87) PCT Pub. No.: WO2013/077725
PCT Pub. Date: May 30, 2013

(65) Prior Publication Data
US 2014/0290319 A1     Oct. 2, 2014

(30) Foreign Application Priority Data

Nov. 21, 2011  (MY) .............. PI2011700170

(51) Int. Cl.
C05C 11/00     (2006.01)
C05G 3/00      (2006.01)
C05F 11/00     (2006.01)

(52) U.S. Cl.
CPC .............. *C05G 3/0029* (2013.01); *C05F 11/00* (2013.01)

(58) Field of Classification Search
CPC .................................................. C05G 3/0029
USPC ....................................... 71/64.07, 64.11, 23
See application file for complete search history.

(56) References Cited

U.S. PATENT DOCUMENTS

| 6,322,606 | B1 | 11/2001 | Komoriya et al. |
| 6,358,295 | B1 | 3/2002 | Tabei et al. |
| 6,358,296 | B1 | 3/2002 | Markusch et al. |
| 6,503,288 | B1 * | 1/2003 | Markusch ............. 71/64.07 |
| 7,452,399 | B2 * | 11/2008 | Whittington ............. 71/63 |
| 7,713,326 | B2 * | 5/2010 | Carstens et al. ............ 71/28 |
| 8,236,086 | B2 * | 8/2012 | Janssen et al. ........... 71/64.07 |

(Continued)

FOREIGN PATENT DOCUMENTS

| CA | 1256710 | 7/1989 |
| JP | 10-324587 | 12/1998 |
| WO | 2004011395 | 2/2004 |

OTHER PUBLICATIONS

English Abstract of JP 10-324587.

(Continued)

*Primary Examiner* — Wayne Langel
(74) *Attorney, Agent, or Firm* — Preston Smirman; Smirman IP Law, PLLC

(57) ABSTRACT

A controlled-release fertilizer comprising fertilizer particles encapsulated in a biodegradable polyurethane obtained from a reaction between a polyisocyanate and an isocyanate-reactive component, which is formed by a polyol and a methyl ester derivative of a natural oil, in the presence of an amine catalyst.

7 Claims, 2 Drawing Sheets

(56) References Cited

U.S. PATENT DOCUMENTS

2010/0307211 A1   12/2010  Xing et al.
2013/0039965 A1*   2/2013  Fujii et al. ..................... 424/419
2013/0305796 A1*  11/2013  Hudson et al. ..................... 71/28
2013/0309499 A1*  11/2013  Neff et al. ..................... 428/407

OTHER PUBLICATIONS

Internationa Preliminary Report on Patentability Dated February 13, 2014.
International Search Report Dated April 26, 2013.

* cited by examiner

CONTROLLED-RELEASE FERTILIZER

CROSS-REFERENCE TO RELATED APPLICATION

The instant application is a national phase of PCT International Patent Application Serial No. PCT/MY2012/000277, filed Nov. 20, 2012, and claims priority to Malaysian Patent Application Serial No. PI2011700170, filed Nov. 21, 2011, pending, the entire specifications of both of which are expressly incorporated herein by reference.

FIELD OF INVENTION

This present invention relates to a controlled-release fertilizer and a method of producing thereof. In more particular, the present invention relates to a controlled-release fertilizer which is encapsulated with a biodegradable polyurethane coating.

BACKGROUND OF THE INVENTION

The particulate fertilizers found available commercially can be produced and marketed in different types such as granules, pellets, ducts, piled or prilled. The fertilizers are generally formed of inorganic substances or organic substances or even a combination thereof.

In order to effectively promote plant growth, the fertilizers have to contain a certain amount of the water-soluble plant nutrients. Some of the typical major water-soluble plant nutrients include compounds of nitrogen, phosphorus, potassium which are often used in conjunction with other elements such as calcium, boron, magnesium, zinc, chloride and others.

Uncoated fertilizers are functioned by their rapid release of the soluble plant nutrients, which would cause phyto-toxicity and rapid depletion of the plant nutrients via leaching. Other problems would be the tendency of the uncoated fertilizers to form cake, create strong odor and become dusty.

As a result, much attempt is driven to overcome the defects caused by the uncoated fertilizers. The fertilizers are provided with coatings or encapsulations aiming for slow release of the plant nutrients.

There are some prior arts relating to encapsulated or coated fertilizers and their several production methods thereof.

A U.S. Pat. No. 6,358,295 discloses a method for producing granular coated fertilizer comprising the steps of adding a water-absorptive polymer to a granular fertilizer, placing the granular fertilizer in a tumbled state, adding liquid uncured urethane resin to the tumbled granular fertilizer in an amount enough to secure a desired of thickness, coating the surface of each granular fertilizer in the uncured urethane resin while keeping the granular fertilizer in the tumbled state and curing thermally the urethane resin while keeping the granular in tumbled state to form a urethane resin layer. The production steps are repeated at least one time. The water-absorptive polymer is acrylate polymer.

A process for producing polyurethane encapsulated, slow release fertilizer particles is described in another U.S. Pat. No. 6,358,296. The process comprising the steps of applying an isocyanate-reactive component onto fertilizer particles to form coated fertilizer particles wherein the isocyanate-reactive component comprises an oleo polyol and applying a polyisocyanate component unto the coated fertilizer particles to form polyurethane encapsulated fertilizer particles.

An European Patent No. 1551783 (published as WO 2004/011395) discloses a controlled release fertilizer material comprising a particulate plant nutrient surrounded by protective coating which comprises a particulate filler. A method of producing the controlled release fertilizer material is also described herein comprising the steps of contacting a particulate plant nutrient with a protective coating comprises a particulate filler material to surround the particulate plant nutrient.

A Canada Patent No. 1256710 claims a fertilizer composition in granular form having a regulated release of water-soluble fertilizer agents such as nitrogen, phosphorus, and potassium compounds. Each granule having a core comprising fertilizer substances, a coating encapsulating the core, wherein the coating is based on a dicyclopentadiene and linseed oil or a soybean oil alkyd to be served as a pH regulator. In the prior art, the coating comprises a first coating layer without any pH-regulating agent whereas a second coating layer around the first layer and including the pH-regulating agent.

The past existing polymer-coated fertilizers are not cost efficient and lack of sufficient abrasion resistance during handling, thus the fertilizers are easily agglomerate and have reduced slow release properties. Due to agglomeration which occurs between the encapsulated fertilizers, this would trigger sticky buildup of the fertilizers in the coating equipment which causes disruption in the continuous production and requires regular cleaning of the equipment.

To prevent the agglomeration of coated-fertilizers, either a filler such as barium sulfate or a methyl ester derivative of natural oil is used to decrease the viscosity of the coating material.

It is desirable to invent a controlled-release fertilizer that has improved abrasion resistance to avoid agglomeration and has efficient slow release of the plant nutrients. It is also desirable to invent a controlled-release fertilizer which has superior hydrophobic qualities by acquiring high content of natural oil polyol in the polyurethane coating.

Natural oil-based polyols are commonly known for their very strong hydrophobic properties due to the presence of long hydrocarbon chain. These hydrophobic properties offer a well protective coating to encapsulate the fertilizer particles and help to prevent the loss of nutrients. The use of natural oil-based polyol would also offer biodegradability to the coating material thus it is non-hazardous and could be digested by microorganisms.

SUMMARY OF THE INVENTION

The main object of the present invention is to invent a controlled-release fertilizer that has improved abrasion resistance to avoid agglomeration and has efficient slow release of the plant nutrients.

Another object of the present invention is to invent a controlled-release fertilizer which has superior hydrophobic qualities by acquiring high content of natural oil polyol in the polyurethane coating.

Still, one object of the present invention is to invent a controlled-release fertilizer which does not produce unpleasant odor and promote dust accumulation.

At least one of the preceding objects is met, in whole or in part, by the present invention, in which the embodiment of the present invention describes a controlled-release fertilizer comprising fertilizer particles encapsulated in a biodegradable polyurethane obtained from a reaction between a polyisocyanate and an isocyanate-reactive component, which is formed by a polyol and a methyl ester derivative of a natural oil, in the presence of an amine catalyst.

In the present invention, the polyurethane coating is formed using a combination of polyol and methyl ester derivative both of a natural oil. The methyl ester derivative of natural oil is useful to reduce the viscosity of the polyols or coating material to ease the application of coating on the fertilizer particles and to prevent agglomeration of the fertilizers. In addition, the natural color of the methyl ester derivative plant oil would enhance the appearance of the encapsulated fertilizers.

DETAILED DESCRIPTION OF THE INVENTION

Figure 1:
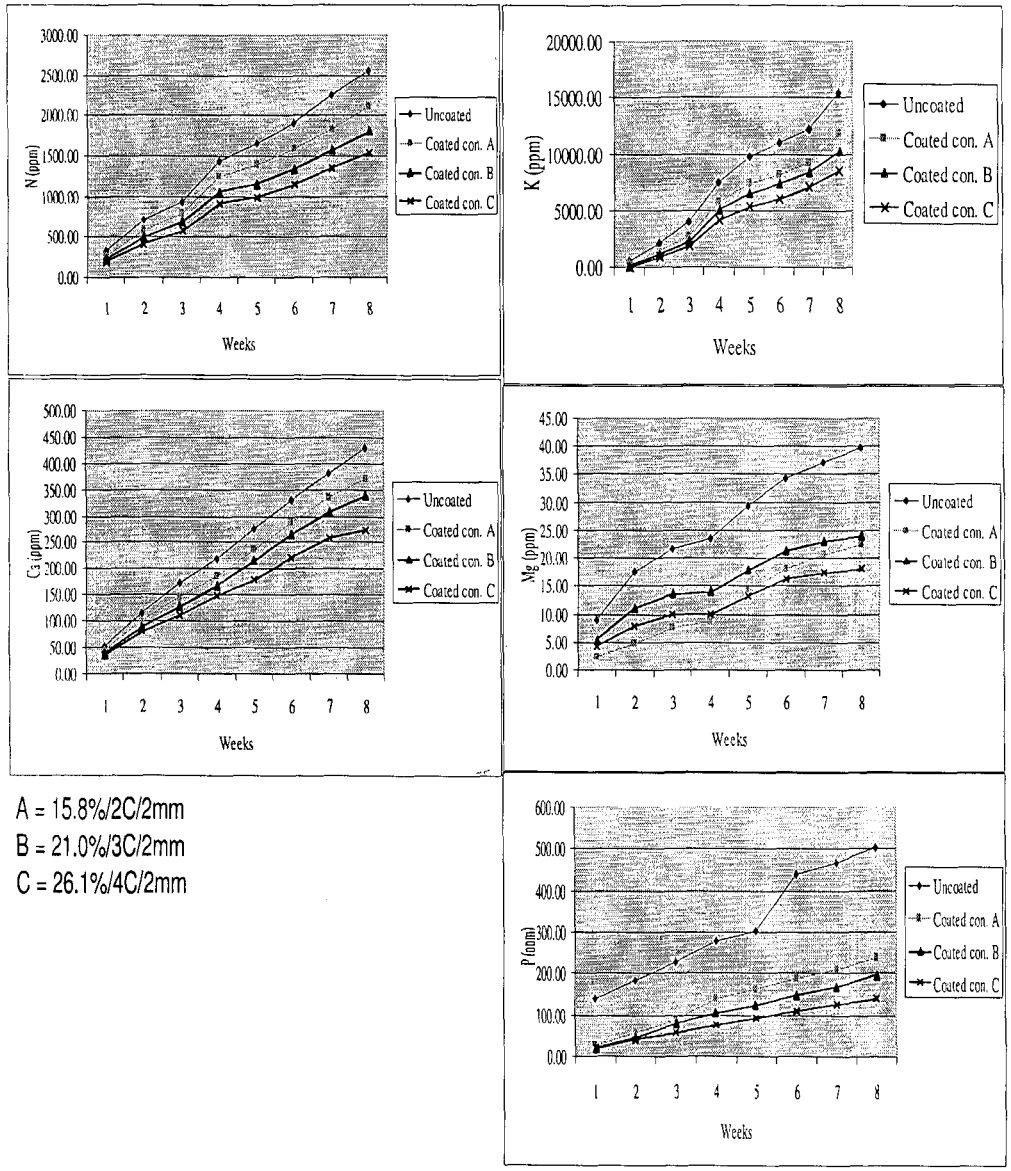
FIG. 1 shows a graph indicating the cumulative nutrients release of the encapsulated fertilizer particles in peat medium.

One skilled in the art will readily appreciate that the present invention is well adapted to carry out the objects and obtain the ends and advantages mentioned, as well as those inherent therein. The embodiment described herein is not intended as limitations on the scope of the invention.

The present invention discloses a controlled-release fertilizer comprising fertilizer particles encapsulated in a biodegradable polyurethane obtained from a reaction between a polyisocyanate and an isocyanate-reactive component, which is formed by a polyol and a methyl ester derivative of a natural oil, in the presence of an amine catalyst.

According to the present invention, the biodegradable polyurethane is a product reacted from a polyisocyanate and an isocyanate-reactive component. The polyisocyanate is monomeric diisocyanate, NCO prepolymer but preferably liquid polyisocyanate and polyisocyanate adduct.

Suitable monomeric diisocyanate could be represented by the formula $R(NCO)_2$ wherein R is an organic group obtained by removing the isocyanate group from an organic diisocyanate having a molecular weight of about 56-1000 and preferably 84-400.

Hereinafter, still another suitable diisocyanate used is also represented by the formula $R(NCO)_2$ wherein R is a divalent aliphatic hydrocarbon group having 4-12 carbon atoms, a divalent cyclo-aliphatic hydrocarbon group having 7-20 carbon atoms or a divalent aromatic hydrocarbon having 6-18 carbon atoms. The most preferred monomeric diisocyanate is where the R represents an aromatic hydrocarbon group.

Several examples of the suitable organic diisocyanates shall include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- or 1,4-diisocyanate, 1-isocyanato-3-isocyanatomethyl-3,5,5-trimethyl-cyclohexane (isophorone diisocyanate or IPDI), bis(4-isocyanatocyclohexyl)methane, 2,4'-dicyclohexylmethane diisocyanate, 1,3- or 1,4-bis(isocyanatomethyl)cyclohexane, bis(4-isocyanato-3-methylcyclohexyl) methane, α,α,α',α'-tetramethyl-1,3- and/or -1,4-xylylene diisocyanate, 1-isocyanato-1-methyl-4(3)-isocyanatomethyl cyclohexane, 2,4- or 2,6-hexahydrotoluene diisocyanate, 1,3- or 1,4-phenylene diisocyanate, 2,4- or 2,6-toluene diisocyanate, 2,4'- or 4,4'diphenylmethane diisocyanate, 1,5-diisocyanato naphathalene or any one of the mixtures thereof.

The compounds being listed above including 1,3- or 1,4-phenylene diisocyanate, 2,4- or 2,6-toluene diisocyanate, 2,4'- or 4,4'diphenylmethane diisocyanate or 1,5-diisocyanato naphathalene are known as the aromatic polyisocyanates. Besides, aromatic polyisocyanates containing 3 or more isocyanate groups such as 4,4'4"-triphenylmethane triisocyanate and polymethylene poly(phenylisicyanates) obtained by phosgenation of aniline/formaldehyde condensates may also be used.

As described in the present invention, the polyisocyanate is also an NCO prepolymer or a polyisocyanate adduct but preferably polyisocyanate adduct. Suitable polyisocyanate adducts would be those containing isocyanurate, uretdione, biuret, urethane, allophanate, carbodiimide and/or oxadiazinetrione groups. The polyisocyanate adducts have an average functionality of 2.0-4.0 and NCO content of 5-30% by weight.

The NCO prepolymer could be prepared by reacting polyisocyanate including polyisocyanate adduct but preferably monomeric diisocyanate with organic compounds which contain at least two isocyanate-reactive groups, preferably at least two hydroxyl groups. These organic compounds have high molecular weight of 500-5000 but preferably 800-3000 and optionally molecular weight of below 400.

In a more preferred embodiment of the present invention, the more preferred polyisocyanate is polymethyl poly(phenylisocyanate) composition having a functionality from about 2.1-3.5, preferably 2.2 to 3.2 and most preferably 2.3-2.8, an NCO group content of about 20-33.4%, preferably 30.5-33% and a monomeric diisocyanate content from 20-90% by weight, preferably 40-80%, wherein the monomeric diisocyanate comprises about 5% by weight of 2-4'-isomer and from about 25-70% by weight of 4,4'-isomer, based on the entire weight of the isocyanate composition.

The polymeric MDI content as referring to polymethylene poly(phenylisocyanate), in addition to monomeric diisocyanate which is two-ring compound, contains three-ring and higher ring-containing compounds. Based on the present invention, the polyurethane MDI content of those isocyanates is about 10-80% by weight, preferably 20-60% by weight.

However, the most preferred polymethylene poly(phenylisocyanate) composition has an average functionality from 2.2-3.2, preferably about 2.3-2.8, an NCO group content of 30-33% by weight and a monomer content from 40-80% by weight, wherein the monomer comprises less than 2% by weight of 2,2'-isomer, from about 2-25% by weight of 2,4'-isomer and from about 35-60% by weight of 4,4'-isomer, based on the entire weight of the isocyanate composition.

Also, the polyisocyanate could be a mixture of polymethylene poly(phenylisocyanate) composition described above together with the adduct of MDI such as allophanates of MDI, urethane of MDI and carbodiimides of MDI.

The isocyanate prepolymer including those examples based on diphenylmethane diisocyanate of either polyethers or polyesters could also be used in the present invention although they are typically less preferred. As long as these isocyanates are in liquid form, they would be suitable for fertilizer encapsulation. For example, the compound is an isocyanate-terminated prepolymer having an NCO content of 10%, a functionality of about 2 and a viscosity of about 2500 mPa·s at 25° C. Such prepolymer can be prepared by reacting 2,4'-isomer rich MDI with a difunctional polyether a product formed from propylene glycol and propylene oxide.

A most preferred polyisocyanate is a polymethylene poly (phenylisocyanate) having an NCO content of about 32.3%, a functionality of about 2.8, a viscosity of about 160 mPa·s at 25° C. and having a weight monomer comprising about 44% by weight of 4,4'-isomer of MDI and 1% by weight of the 2,2'-isomer MDI.

Another most preferred polyisocyanate is diphenylmethane diisocyanate which is rich in 2,4'-isomer. Specifically, the diphenylmethane diisocyanate having an isomer distribution comprising about 44% by weight of 4,4'-isomer, about 54% by weight of 2,4'-isomer and about 2% by weight of 2,2'-isomer. This diisocyanate has an NCO content of about 33.6%, a functionality of about 2.0 and a viscosity of less than about 25 mPa·s at 25° C.

The present invention claims the biodegradable polyurethane is obtained from a reaction between a polyisocynate and an isocyante-reactive component, in the presence of an amine catalyst and an additive. The isocyanate-reactive component shall consist of a polyol and a methyl ester derivative of a natural oil wherein the amine catalyst and the additive could be included together with either the polyisocyanate or the isocyanate-reactive component.

In the present invention, the isocyanate-reactive component is formed by a polyol derived of a natural oil wherein the natural oil is castor oil, soybean oil, sunflower oil, linseed oil, cottonseed oil, peanut oil, rapeseed oil, coconut oil, palm oil and fish oil but preferably palm oil. A mixture of the oils selected from at least any two of the aforementioned natural oils could be used. In general, the natural oil-based polyol is obtained from plant oil, vegetable oil or fish oil.

The natural oil-based polyol is prepared by epoxidization of the double bonds contained in the natural oil and followed by ring opening reaction of the epoxy group with monohydric or polyhydric alcohols in the presence of an acidic catalyst. The natural oil polyol shall have OH numbers of 50-300 and viscosity of 100-5000 mPa·s at 25° C.

In a preferred embodiment of the present invention, the preferred natural oil polyol is characterized by OH value of about 70-130 mg KOH/g sample and a viscosity of about 600-7500 cP at 25° C.

Due to the presence of natural oil-based polyol and a methyl ester derivative of a natural oil in forming the polyurethane coating, the coating implements slow release of the plant nutrients, provides improved abrasion resistance, reduces stickiness between the encapsulated fertilizers thus avoiding agglomeration, produces less unpleasant odor and less dusty upon application to soil ground.

The present invention discloses the isocyanate-reactive component is formed by a methyl ester derivative of a natural oil wherein the natural oil is castor oil, soybean oil, sunflower oil, linseed oil, cottonseed oil, peanut oil, rapeseed oil, coconut oil, palm oil and fish oil but preferably palm oil.

Hereinafter, the methyl ester derivative of a natural oil is preferably palm oil methyl ester. The methyl ester derivative of natural oil is useful to reduce the viscosity of the polyols or coating material to ease the application of coating on the fertilizer particles and to prevent agglomeration of the fertilizers. The appearance of the encapsulated fertilizers could be enhanced by favorable natural color of the methyl ester derivative.

As disclosed in the present invention, the catalyst used is preferably a non-toxic type preferably an amine catalyst. The additive which could be added to the polyisocyanate or isocyanate-reactive component is selected from the group consisting of inert filler, flow aid, surfactant and defoamer. A mixture of the additives selected from at least any two of the aforementioned additives could be used.

In a preferred embodiment of the present invention, a controlled-release fertilizer comprising fertilizer particles encapsulated in a biodegradable polyurethane obtained from a reaction of a polyisocyanate and an isocyanate-reactive component which is formed by a palm oil-based polyol and a methyl ester derivative of palm oil in the presence of an amine catalyst and barium sulfate and/or zeolite as the inert filler.

The present invention describes the fertilizer particles are water-soluble or partially water-soluble. The fertilizer particles are also preheated to remove any moisture therefrom wherein the heating is preferably at a temperature from 60-105° C., most preferably at 80° C. using a preheater, oven or drier. The heating step also helps to initiate the encapsulation process, speed up the polyurethane coating reaction and avoid bubbles formation between the fertilizer particle and the coating.

Attrition resistance and slow release fertilizer particles are preferably produced by applying the isocyanate-reactive component and the polyisocyanate to the fertilizer particles at ambient temperature, but preferably the fertilizer particles are preheated to a temperature of about 80° C.

In the present invention, the controlled-release fertilizer is a chemical fertilizer or a bio-fertilizer but preferably bio-fertilizer which is the biomass of plants, particularly the biomass of oil palm plantation and/or palm oil mill effluent such as palm oil fibres, palm oil fruit bunches and others.

On the other hand, the chemical fertilizer is ammonium sulfate, ammonium nitrate, urea, guanidine, melamine, sodium nitrate, ammonium phosphate, potassium phosphate, potassium chloride or any combination thereof. In addition, the fertilizer particles can optionally contain additives such as herbicide, insecticide, trace element, iron salt, sulfur and others.

The present invention claims the biodegradable polyurethane is used in an amount ranging from 2-30 wt % of the total weight of controlled-release fertilizer, preferably 4-25 wt % and most preferably 8-19 wt % of the fertilizer. The controlled-release fertilizer is characterized by a water absorption of less than 1% preferably less than 0.5% based on the total weight of the polyurethane coating.

A method of producing the controlled-release fertilizer is also described herein the present invention. The method of producing the fertilizer comprising the steps of preheating fertilizer particles at a temperature ranges from 60-105° C. and coating the preheated fertilizer particles to form polyurethane-coated fertilizer particles.

One embodiment of the present invention mentions a method of producing the controlled-release fertilizer comprising the coating step which is performed by applying an isocyanate-reactive component formed by a polyol and a methyl ester derivative of a natural oil to the preheated fertilizer particles to form coated fertilizer particles and adding a polyisocyanate to the coated fertilizer particles to react with the isocyanate-reactive component to form polyurethane-coated fertilizer particles in the presence of an amine catalyst.

Still, in another embodiment but less preferred, the present invention discloses a method of producing the controlled-release fertilizer comprising the coating step which is performed by applying a polyisocyanate to the preheated fertilizer particles to form coated fertilizer particles; and adding an isocyanate-reactive component formed by a polyol and a methyl ester derivative of a natural oil to the coated fertilizer particles to react with the polyisocyanate to form polyurethane-coated fertilizer particles in the presence of an amine catalyst.

An alternative embodiment of the present invention describes a method of producing the controlled-release fertilizer comprising the coating step which is performed by applying a mixture of a polyisocyanate and an isocyanate-reactive component formed by a polyol and a methyl ester derivative of a natural oil to the preheated fertilizer particles in the presence of an amine catalyst.

In the aforementioned alternative embodiment, the mixture of the polyisocyanate and the isocyanate-reactive component is added together either in batch quantity or continuously. For the mixing process, it is preferred that the ratio of isocyanate to hydroxyl groups shall be 0.8:1 to 2.0:1, preferably 0.93:1 to 1.1:1.

Further claimed in the present invention, the most preferred fertilizer particles used as a bio-fertilizer is composed of biomass of palm and/or palm oil effluent. The most preferred natural oil-based polyol is derived of palm oil whereas the methyl ester derivative is also of palm oil.

The additive is selected from the group consisting of inert filler, flow aid, surfactant and defoamer but preferably the use of barium sulfate and/or zeolite as the inert filler of the additive.

In addition, the polyisocyanate is reacted with the isocyanate-reactive component having such that the ratio of NCO group to hydroxyl group is about 2.0-0.8, preferably 1.1-0.9 and most preferably 1.05-0.95.

In the present invention, it is advantageous to preheat the fertilizer particles as to remove any moisture therefrom, initiate the encapsulation process, speed up the polyurethane coating reaction and avoid bubbles formation between the fertilizer particle and the coating. The heating step could be implemented using a preheater, oven or drier. The fertilizer particles are heated at a temperature ranges from 60-105° C. but preferably 80° C.

The present invention indicates the production method of the controlled-release fertilizer is performed using a mixing apparatus operated with continuous low shear, low impact and gentle motion to agitate the fertilizer particles throughout the encapsulating process. Suitable mixing apparatus shall include fluid bed, rotating drum, pan pelletizer and others.

Upon multiple steps of applying the polyurethane coating on the fertilizer particles to achieve a desired thickness, the coated fertilizers are further heated at a temperature of 80° C. for about 15-60 minutes to cure the polyurethane coating and to prevent the coated fertilizer particles from sticking together and remain in a free-flow form.

EXAMPLES

Example 1

The materials are fertilizer particles, polyol, polyisocyanate, palm oil methyl ester, catalyst and filler. The fertilizer particles used are a palm-based bio-fertilizer prepared by Malaysian Palm Oil Board.

The natural oil-based polyol is of palm oil obtained by the reaction between an alcohol and an epoxidized palm oil, having an OH value of about 70-90 mg KOH/g sample, equivalent weight of 801.43-623.33 and a viscosity of 600-800 cP at 25° C.

The polyisocyanate is a polymethylene poly(phenylisocyanate) containing about 66% diphenylmethane diisocyanate monomers having a 2,4'-isomer content of about 19% by weight, based on total weight of the polymethylene poly (phenylisocyanate), 345 by weight of higher functionality homologs and having an overall isocyanate group content of about 32.3% and a functionality of about 2.3.

The palm oil methyl ester is supplied by Cognis Oleochemicals (M) Sdn. Bhd. The catalyst is a solution of 33% triethylenediamine and 67% dipropylene glycol commercially available from Air Products and Chemicals Inc as Dabco A33LV. The filler is barium sulfate commercially available from System.

The materials are used according to the amount in unit gram, as based on Table 1,

TABLE 1

| Raw material | Sample ID | | | |
|---|---|---|---|---|
| | Uncoated | A | B | C |
| Polyol | — | 3.00 | 6.00 | 9.00 |
| Palm oil methyl ester | — | 3.00 | 6.00 | 9.00 |
| Catalyst | — | 0.20 | 0.40 | 0.60 |
| Filler | — | 3.00 | 6.00 | 9.00 |
| Polyisocyanate | — | 1.02 | 2.04 | 3.06 |

Each sample comprising the materials of polyol, palm oil methyl ester, catalyst, filler which form the isocyanate-reactive component are mixed together in a 500 ml container for about 30 seconds until the materials have coated on the bio-fertilizer particles. The bio-fertilizer particles used herein are 100 g of a preheated palm-based bio-fertilizer.

Polyisocyanate in the relevant amount is added to the polyol coated pellets and the container is shaken for about 2 minutes until the polyisocyanate coated the polyol-coated pellets. The steps of applying the isocyanate-reactive component and polyisocyanate are repeated several times until a desired thickness of the polyurethane coating is achieved.

The encapsulated fertilizer particles are then dried by heating in an oven at a temperature of 80° C. for about 15-60 minutes for preventing the particles from sticking together.

Example 2

The slow release properties of the encapsulated fertilizer particles in Example 1 shall be examined. Each fertilizer sample of about 15 g is placed on filter paper and moisten by 50 g of water on a daily basis. The filtered water is collected and stored at room temperature in a closed glass container. After a week, the release of nutrients is determined by testing the filtered water.

The sample ID of uncoated, A, B and C as in Table 1 are respectively referred as a bio-fertilizer with 0%, 15.82%, 21% and 26% polyurethane coating, as based on the total weight of the encapsulated fertilizer particles. The result of the cumulative nitrogen release in ppm for the uncoated and coated palm-based potassium bio-fertilizer is indicated in Table 2,

TABLE 2

| Sample ID | Week | | | | | | | |
|---|---|---|---|---|---|---|---|---|
| | 1 | 2 | 3 | 4 | 5 | 6 | 7 | 8 |
| Uncoated | 720.59 | 1199.99 | 1496.77 | 1809.12 | 2088.32 | 2428.65 | 2736.35 | 2960.13 |
| A | 363.63 | 710.86 | 961.05 | 1273.40 | 1552.60 | 1809.01 | 2107.38 | 2312.51 |
| B | 302.32 | 593.69 | 804.28 | 1014.07 | 1223.86 | 1447.64 | 1699.39 | 1876.55 |
| C | 254.51 | 484.49 | 657.76 | 802.29 | 942.15 | 1109.98 | 1277.81 | 1441.00 |

From Table 2, the nitrogen release of uncoated fertilizer particles is the fastest to leach as compared to encapsulated ones. The encapsulated fertilizer particles with the higher weight percentage of coating leach nitrogen slower than the encapsulated fertilizer particles with lower encapsulation percentage.

Besides, the result showing the nutrient leaching test is carried out on various combination mixtures of encapsulated fertilizer samples in different percentages. The test is to be carried out for only the first week as tabulated in Table 3 below,

TABLE 3

| | | Nutrient Release, ppm | | | |
|---|---|---|---|---|---|
| 1 | Sample ID | Nitrogen, N | Potassium, K | Calcium, Ca | Magnesium, Mg |
| 2 | A | 232.39 | 3905.90 | 18.64 | 3.50 |
| 3 | B | 297.09 | 3627.23 | 18.93 | 3.36 |
| 4 | C | 244.69 | 1862.73 | 8.60 | 0.82 |
| 5 | A + B + C | 333.62 | 3549.80 | 17.04 | 2.93 |
| 6 | A + B | 328.71 | 3554.34 | 19.12 | 4.10 |
| 7 | A + C | 351.86 | 3896.26 | 19.18 | 3.44 |
| 8 | B + C | 334.45 | 3416.65 | 16.40 | 3.66 |

In Table 3, the nutrient release of the fertilizers could be manipulated by using the mixture of encapsulated fertilizer particles with different encapsulation percentage. Thus, fertilizers with different levels of nutrient release could be obtained by this usage.

Example 3

The materials comprising polyol, methyl ester derivative and polyisocyanate are used according to the stated amount in Table 1 above and the fertilizer samples are produced following the method under Example 1. The bio-fertilizer particles used herein are 100 g of a preheated palm-based bio-fertilizer.

The encapsulated bio-fertilizer granules from each sample are tested of the slow release properties as compared to the uncoated one. About 20 g of fertilizer pellets are placed on peat or sand medium and moisten with 100 g of water on a daily basis. The filtered water is collected and stored at room temperature in a closed glass jar. After one week, the release of the nutrients is determined by testing the filtered water.

Figure 2:
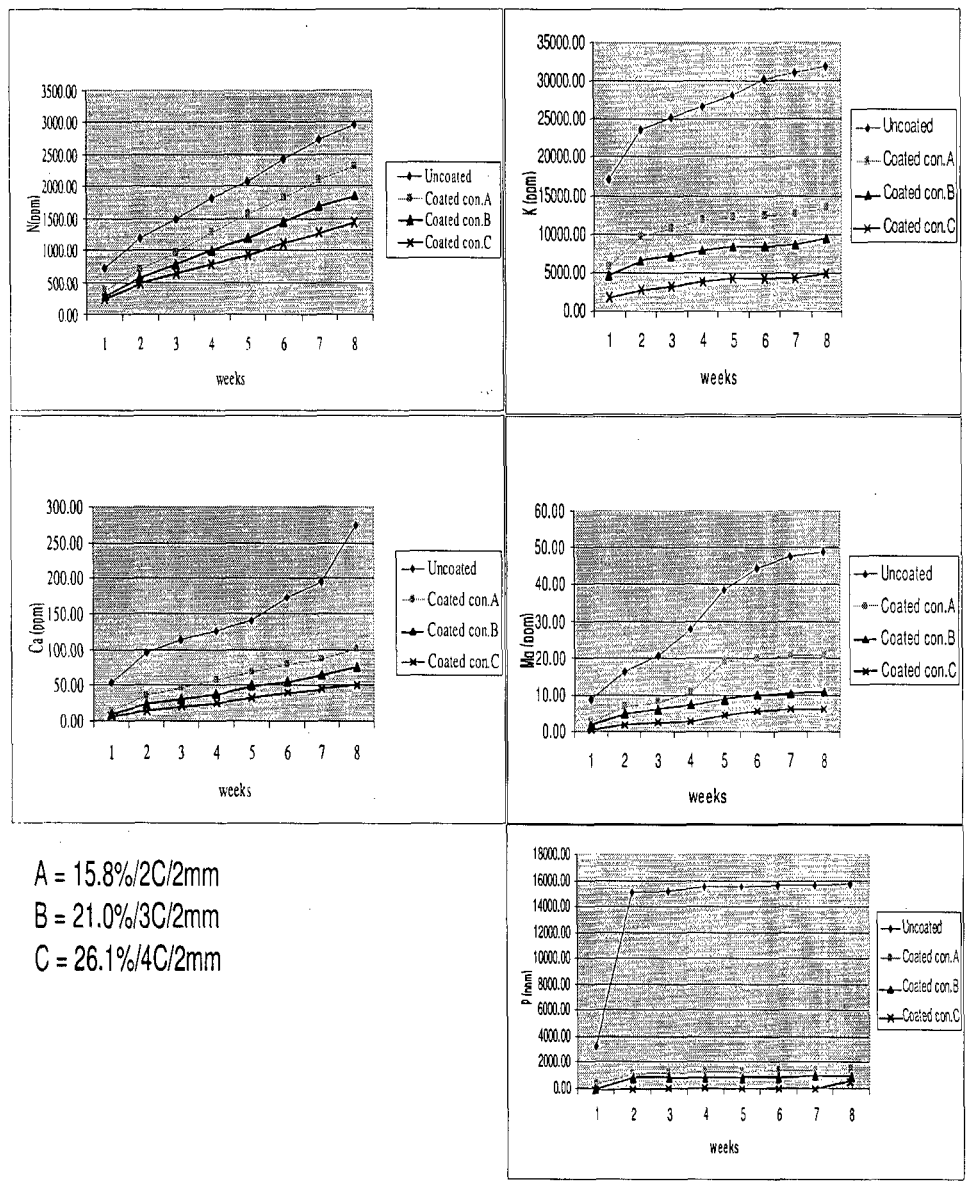
FIG. 2 shows another graph indicating the cumulative nutrients release of the encapsulated fertilizer particles in sand medium.

The tests are carried out for 8 weeks, whereby the nutrients released are measured on weekly basis as shown in FIG. 1 and FIG. 2. The sample ID of uncoated, A, B and C respectively are referred as a bio-fertilizer having 0%, 15.82%, 21% and 26% polyurethane coating based on the total weight of the encapsulated fertilizer particles.

FIG. 1 shows the cumulative nutrients of N, Ca, K, Mg and P release from palm-based potassium bio-fertilizers encapsulated with palm oil-based slow release polyurethane coating in peat medium. FIG. 2 shows the cumulative nutrients of N, Ca, K, Mg and P release from palm-based potassium bio-fertilizers encapsulated with palm oil-based slow release polyurethane coating in sand medium.

In FIG. 1 and FIG. 2, the number of coating layers is indicated as 2C, 3C and 4C. As in both figures, 2C, 3C and 4C respectively indicate 2 layers of 15.8 wt % polyurethane coating, 3 layers of 21.0 wt % coating and 4 layers of 26.1 wt % coating.

The invention claimed is:

1. A controlled-release fertilizer, comprising:
   fertilizer particles encapsulated in a biodegradable polyurethane obtained from a reaction between a polyisocyanate component and an isocyanate-reactive component in the presence of an amine catalyst;
   wherein the isocyanate-reactive component is formed by a polyol derivative of a natural oil and a methyl ester derivative of a natural oil;
   wherein the polyisocyanate component includes a polyisocyanate adduct;
   wherein the fertilizer particles are formed from a bio-fertilizer containing a material selected from the group consisting of oil palm biomass, palm oil mill effluent and combinations thereof.

2. The fertilizer as claimed in claim 1, wherein the biodegradable polyurethane is used in an amount ranging from 2%-20% by weight of the fertilizer.

3. The fertilizer as claimed in claim 1, wherein the fertilizer particles are water-soluble or partially water-soluble.

4. The fertilizer as claimed in claim 1, wherein the fertilizer particles are preheated to remove moisture therefrom.

5. The fertilizer as claimed in claim 1, wherein the natural oil is selected from the group consisting of castor oil, soybean oil, sunflower oil, linseed oil, cottonseed oil, peanut oil, rapeseed oil, coconut oil, palm oil, fish oil and combinations thereof.

6. The fertilizer as claimed in claim 1, wherein the polyisocyanate adduct has an average functionality in the range of 2.0-4.0 and NCO content in the range of 5-30% by weight.

7. The fertilizer as claimed in claim 1, wherein the polyisocyanate adduct includes a compound having a functional group selected from the group consisting of isocyanurate, uretdione, biuret, urethane, allophanate, carbodiimide, oxadiazinetrione and combinations thereof.

* * * * *